(12) United States Patent
Wissendheit et al.

(10) Patent No.: US 8,078,108 B2
(45) Date of Patent: Dec. 13, 2011

(54) PROTOCOL-CONTROLLED ANTENNA SELECTION

(75) Inventors: Uwe Wissendheit, Erlangen (DE); Dina Kuznetsova, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 847 days.

(21) Appl. No.: 11/850,102

(22) Filed: Sep. 5, 2007

(65) Prior Publication Data

US 2008/0024307 A1      Jan. 31, 2008

Related U.S. Application Data

(63) Continuation of application No. PCT/EP2006/002134, filed on Mar. 8, 2006.

(30) Foreign Application Priority Data

Mar. 9, 2005   (DE) .................. 10 2005 011 160
Apr. 14, 2005  (DE) .................. 10 2005 017 335

(51) Int. Cl.
    *H04B 1/00*         (2006.01)
(52) U.S. Cl. .................. 455/42; 340/13.1; 370/280
(58) Field of Classification Search .................. 455/41; 340/572, 10; 370/280
    See application file for complete search history.

(56) References Cited

U.S. PATENT DOCUMENTS

| | | | |
|---|---|---|---|
| 6,018,555 A | 1/2000 | Mahany | |
| 6,023,610 A | 2/2000 | Wood, Jr. | |
| 6,069,564 A | 5/2000 | Hatano et al. | |
| 6,628,235 B2 * | 9/2003 | Wight | 342/374 |
| 2004/0266375 A1 | 12/2004 | Li et al. | |
| 2007/0274242 A1* | 11/2007 | Lamacraft et al. | 370/310 |

FOREIGN PATENT DOCUMENTS

| | | |
|---|---|---|
| EP | 1315325 A | 5/2003 |
| JP | 2002-245416 A | 8/2002 |

OTHER PUBLICATIONS

Official communication issued in International Application No. PCT/EP2006/002134, mailed on Jun. 23, 2006.

* cited by examiner

*Primary Examiner* — Nay Maung
*Assistant Examiner* — Richard Chan
(74) *Attorney, Agent, or Firm* — Keating & Bennett, LLP

(57) ABSTRACT

The idea on which the present invention is based is that transmitting and receiving data by an antenna or an antenna array may be performed more efficiently by analyzing protocol data of a transmit protocol, which control the data flow between a transmitting and a receiving device, by a controller, and by individually setting transmission times and receiving times on the basis of this analysis, or by specifically selecting a single antenna from an antenna array.

14 Claims, 3 Drawing Sheets

US 8,078,108 B2

PROTOCOL-CONTROLLED ANTENNA SELECTION

CROSS-REFERENCE TO RELATED APPLICATIONS

This application is a continuation of copending International Application No. PCT/EP2006/002134, filed Mar. 8, 2006, which designated the United States and was not published in English.

BACKGROUND OF THE INVENTION

1. Field of the Invention

The present invention relates to a method for antenna selection such as is applied in the area of radio/high frequency identification systems.

2. Description of the Related Art

In many technical applications, it is useful to control the active phase of an antenna. Particularly in the area of radio/high frequency identification systems, i.e. systems for identifying objects and living organisms by RFID, or transponder, technologies, it is often necessary, for example, to achieve a selection result by multiple transmitting and/or receiving. The number of such RFID systems has significantly increased over the last few years; they serve for a contactless identification of objects or products, for example.

The transmitting frequencies of those systems are mainly in the ISM frequency bands which may be used by industry, science and medical technology without a license. In this context, the special feature of transponder technology is that the transponders and/or receivers, which are usually passive, draw the energy which is necessary for their function from the field used for transmitting and receiving data. Depending on the function principle, one distinguishes between electromagnetic and inductive systems, both systems using different kinds of antennas for the efficient coupling of a transmitter and a receiver. In inductive coupling, for example, in a simple example, an antenna will comprise a conductor loop, wherein the voltage induced in the conductor loop by a magnetic field present throughout the loop may be evaluated as a signal. Since the magnitude of the induced voltage depends on the magnetic flux present throughout the entire conductor loop, it is necessary, for a maximum coupling of the transponder to the magnetic field, that the area normal of the area formed by the conductor loop be parallel to the field direction of the magnetic field. If the transmitter generates the magnetic field also by a coil, the area normals of the transmitting coil and the receiving coil of the transponder are ideally parallel with each other to achieve the best possible coupling between the transmitter and the receiver. In the worst case in which the area normal of the transmitting coil is orthogonal to the area normal of the receiving coil, no direct data transmission is possible anymore. In most cases, RFID systems work with only one antenna, which is the reason why, due to the fact described above, a selection is possible only in one space direction. There are application areas, however, in which, due to the orientation of one or more transponders, a single antenna is not sufficient. In this context, one consider, for example, a pallet full of products to be sensed, which are arranged in different orientations on the pallet. In such cases, in inductive systems, for example, the shape of the antenna may be altered by employing special spatially-shaped wire windings. Furthermore, several antennas which are spatially separated and arranged in different orientations with respect to one another may be employed, wherein switching between those is performed according to a predetermined established switching pattern.

By established switching patterns in switching between several antennas, only antenna frame times which are the time intervals in which an antenna is active having a fixed period or fixed time frame, may be adjusted, wherein the antenna frame time must be larger than the duration of the longest transmitting and/or receiving operation to be expected. Thereby, long read/write times develop during repeating read/write operations by means of different antennas. If the illumination of four space directions by four antennas is necessary, for example, a single read/write operation will need four times the transmission time of the read/write operation of maximum duration, irrespectively of how long the transmission time of the data to be transmitted actually is.

SUMMARY OF THE INVENTION

According to an embodiment, a method for determining an active phase of an antenna during a transmitting or receiving operation may have the steps of receiving protocol data of a transmit protocol controlling the data flow between a transmitting device and a receiving device, of evaluating the protocol data by control means to determine a time interval for the duration of the active phase of the antenna, and of controlling the active phase of the antenna based on the evaluation of the protocol data.

An embodiment may have a computer program having a program code for executing the above-mentioned method when the program runs on a computer.

According to another embodiment, a device for determining an active phase of an antenna, during a transmitting or receiving operation, may have a receiving device for receiving protocol data of a transmit protocol controlling the data flow between a transmitting device and a receiving device, control means for evaluating the protocol data which is implemented to be able to determine the time interval for the duration of the active phase of the antenna, and a device for controlling the active phase of the antenna based on the evaluation of the protocol data.

The basic idea of an embodiment of the present invention is that during a transmitting or receiving operation, an active phase of an antenna can be controlled by analyzing the protocol data of a transmit protocol controlling the data flow and by deriving therefrom the transmit duration to be expected, or by dynamically adjusting the current transmitting/receiving duration as reaction to events occurring during the communication. Thereby, the actual transmitting times can be used for controlling an antenna, and it is possible to increase the efficiency of data transmission in comparison to prior methods operating with a pre-set transmitting duration per antenna.

In a particular embodiment of the present invention, the data transmit protocol controlling the data flow between a transponder and a read/write device and/or an identification unit is evaluated by control means, or a control module, and is used to calculate the necessary duration of an active phase of an antenna and/or the frame time, and to select a suitable active antenna from a plurality of antennas. In this context, the payload data to be transmitted are transmitted by an external device, which may be a PC, for example, and are independent of the protocol data to be evaluated. For the purpose of evaluating the protocol information, the protocol information extracted in the read/write device are forwarded to the protocol-dependent control module. Examples of protocol information transmitted to the control module include a command code and a response code. The command code may be a write instruction or a read instruction, for example. In a write operation, the data to be written are additionally transmitted from the read/write device to the transponder. Thereby, the transmitting duration and/or request frame of a write command is prolonged in comparison to the request frame of a read command, so the necessitated turn-on time of an antenna can be calculated on the basis of this information. In the case of a response of the transponder, similar considerations may be made. The response code contains status fields, so-called flags, indicating whether errors have occurred during the transmission of the information. This may cause the control means to repeat the transmission and/or, after a predetermined maximum duration, to terminate the communication or to try again to transmit via another antenna. In the case of collisions of data packets, the frame time, for example, may be prolonged, and thus, dynamically adjusted, if additional time (time slots) is needed for the communication.

By the flexible determination of the antenna frame time and the possibility of antenna selection described above, different special modes describing the performance of the control unit can be derived for certain cases of applications. For example, apart from the usual identification, a secure identification may be necessitated, the information of several read operations of different antennas being evaluated in the secure identification, in contrast to the usual identification. Furthermore, a localization mode in which typically all antennas are used may be implemented, their turn-on duration and turn-on order being controlled by the control unit based on the information of the transmit protocol, so that a statement concerning the location at which a transponder is present may be made from the protocol evaluation.

In a further embodiment of the present invention, the method is implemented on a programmable FPGA chip. In this context, the control means obtains, from the read/write device, the command code and the response code from which, among other things, the start time and the end time of a data packet to be transmitted are determined. Furthermore, the FPGA structure includes means to parallelize the protocol data provided in serial form by the read/write device. Apart from this, the information indicating whether there was a collision of several packets during the last data transmission attempt, so that the current transmitting/receiving time must be prolonged, and indicating whether the possible multiple transmission of a data packet has returned the same respective response is forwarded by the read device to the control unit. Additionally, user inputs to the control unit are possible, such as the number of the antennas available, an antenna number, a frame time or the selection of an operational mode. Additionally, an external clock may be predetermined for the FPGA chip which is processed by a clock generation unit which in turn synchronizes the entire operations arising on the chip. After calculating the frame time and the antenna to be selected, the antenna number and the frame time are forwarded in an encoded form to an external decoder driving the antennas of an antenna array with the decoded information.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF PREFERRED EMBODIMENTS

Figure 1:
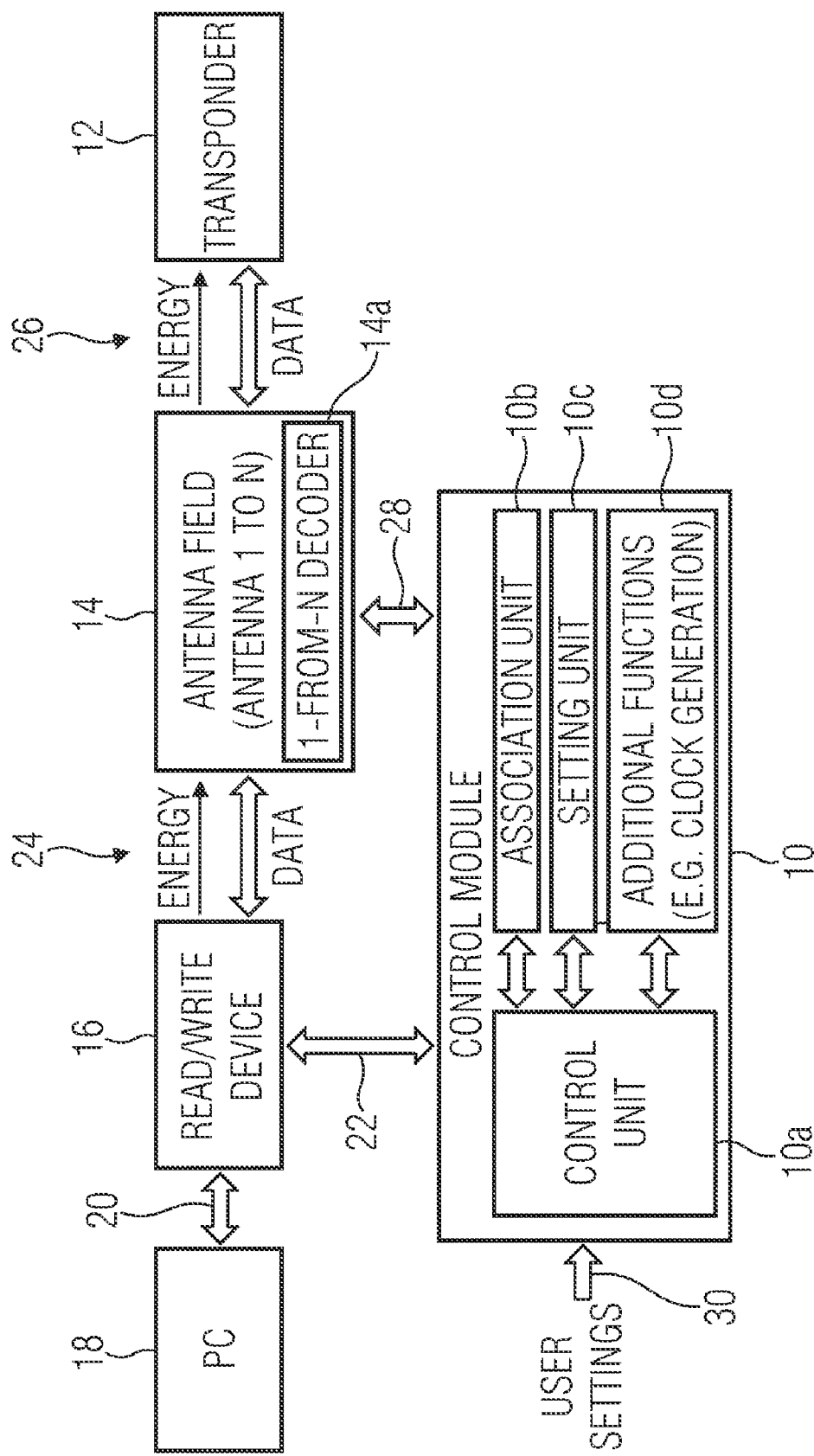
FIG. 1 is a schematic flow diagram according to an embodiment of the present invention.

FIG. 1 shows a control module or control means 10, containing a control unit 10a, an association unit 10b, a setting unit 10c, and an additional functional unit 10d and implementing the inventive method, a transponder 12, an antenna field 14 containing a "1-from-N-decoder" 14a, a read/write device 16 and a personal computer, or PC, 18.

The functional units 10a-10d located within the control module 10 are connected with one another through data lines for the purpose of data exchange within the control module 10. For the purpose of data exchange, the PC 18 is, via a first data connection 20, connected to a read/write device 16 which in turn is connected to the control module 10 via a second data connection 22. Apart from that the read/write device 16 is connected with the antenna field 14 via a connection 24, both data and the feed energy of the transponder being transmitted from the read/write device to the antenna field 14 via the connection 24. An antenna of the antenna field 14 establishes a connection 26 to the transponder 12 via the electromagnetic field emitted by it, both data and the feed energy for the transponder being transferred via this connection. The control module 10 is connected to the antenna field 14 via a data line 28 to control the antennas of the antenna field 14. Via a user interface 30, the user may additionally pass predetermined basic settings to the control module 10.

The method illustrated allows the protocol-dependent control and selection of antennas and the calculation of the turn-on time of these antennas by information gained from the data transmit protocol controlling the data flow between the transponder 12 and the read/write device 16. Payload data to be transmitted are transmitted from the PC 18 via the data connection 12 to the read/write device 16, or a request for reading data from the transponder 12 is transmitted to the read/write device 16. The content of the payload data itself does not play a role in the method, so that those are not further considered. The read/write device 16 combines the payload data in a suitable manner with the protocol data, which control the data flow, of the data transmit protocol used, such as ISO/IEC 15693. To enable controlling the antenna turn-on times, the protocol information extracted from the read/write device 16 is, together with further information generated in the read/write device 16, passed on to the control module 10 via the connection 22. The read/write device 16 transmits the data to the controllable antenna field 14 via the connection 24, the data being transmitted to the transponder 12 by the currently active antenna or being read by the transponder. In this context, it is to be noted that the transponder 12 draws the energy it needs for functioning from the data-transmitting field itself, and, thus, this energy is in the end supplied by the read/write device 16. The time frames for the currently selected antenna are, together with the user/basic settings applied upon the control module 10 via the user interface 30 and stored in the setting unit 10c, identified by the control unit 10a. In the association unit 10b, the information about the antenna to be selected is combined with the calculated time frame and transmitted to the antenna field 14 via the data line 28. This combined information is reconstructed by the "1-from-N-decoder" 14, and the antenna determined by the control unit 10a is selected for the length of the necessitated time frame. The additional functional unit 10d of the control module 10 may implement additional functionalities, so a clock generator, for example, may be necessitated within the control module.

In this context, for calculating the time frames, the command code of the data transfer protocol substantially determining the structure of the request and response frames is evaluated by the control unit 10a. Also, the response code substantially giving information on transfer errors is evaluated. A command instruction may be a write or a read command. If the command "write" is selected, for example, the data to be written will additionally be transmitted to the transponder. Thereby, the request frame, or request, of a write command is prolonged in comparison to the request frame for a read command which does not yet contain the data to be read. Similar considerations are also made concerning the response of the transponder, response. For example, status fields, so-called "flags", are evaluated to see whether errors, or collisions, have occurred during the transmission of the information. This would imply, for example, repeating the transmission, terminating the communication after a determined maximum duration, trying again to communicate via another antenna, or, in the case of collisions, prolonging the current time frame. By the adjustment of the turn-on duration and/or the frame length of an antenna to the duration of the data actually waiting for transmission, a superfluous turn-on time of an antenna is avoided. If multiple transmitting is necessitated, the necessitated time expenditure will thereby be in part considerably reduced in comparison to conventional methods. This particularly applies if transmitting by means of several antennas is necessary for achieving a successful read or write operation, wherein it is additionally beneficial in this context that the determination of the antenna to be used is also protocol-dependent.

The possibility to derive special modes which may be mapped onto determined cases of applications results from this intelligent and flexible controllability of the antenna field 14 and from the possibility of antenna selection by the control module 10. For example, a secure identification can be guaranteed by redundancy of the identification by means of different antennas. Thus, the difference between the usual and the secure identification is that with the secure identification, the information of several read operations of different antennas is evaluated and compared, and it is decided afterwards whether further antennas will be involved in the read operation, whose time frames are then in turn calculated from the transfer protocol. If several antennas, whose turn-on time frame is controlled by the control module, are deployed, a localization of the transponder may also be performed. As a rule, all antennas are used in the localization mode, and their turn-on time is in turn controlled by the information of the transmit protocol.

Figure 2:
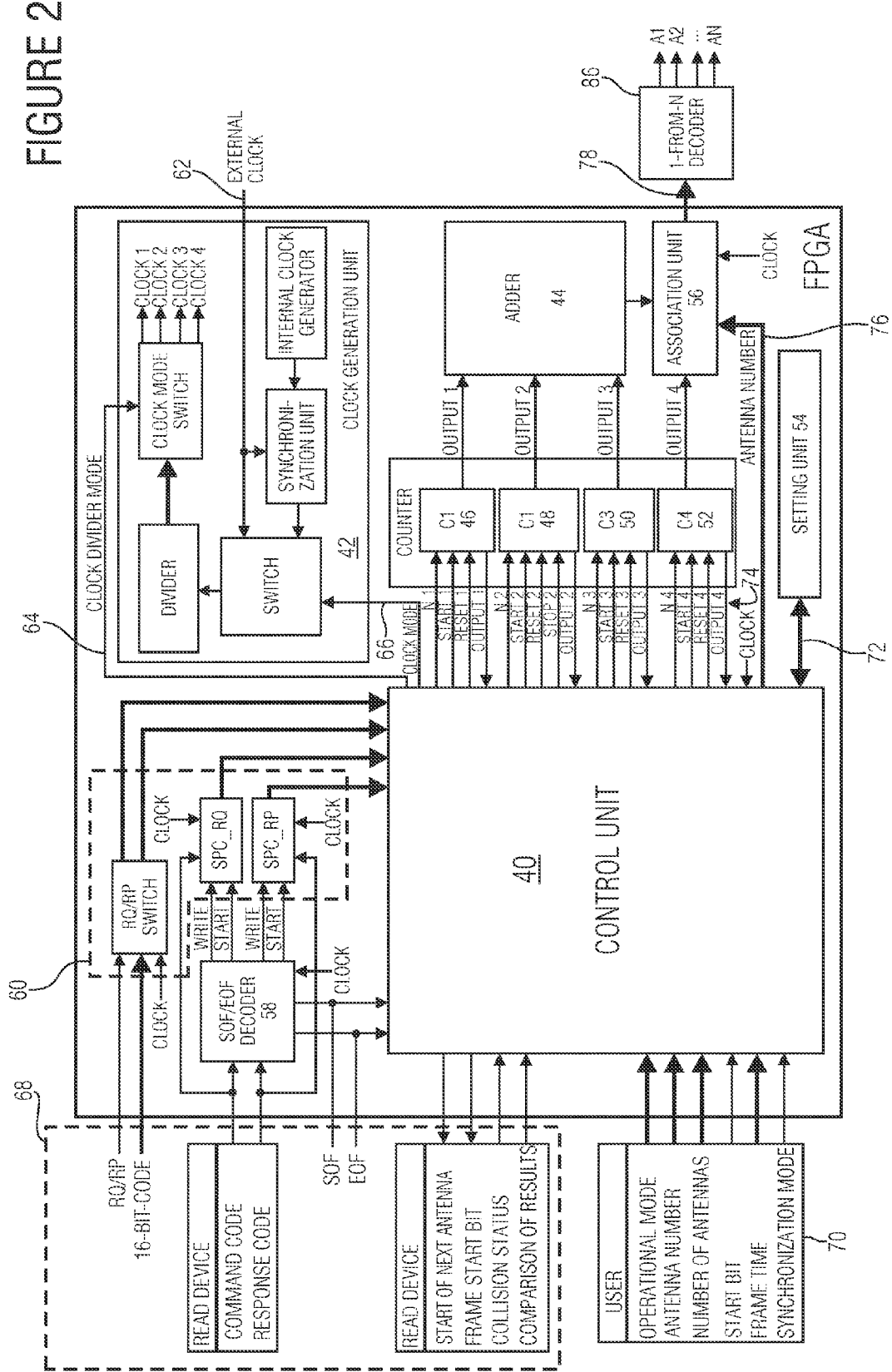
FIG. 2 is a block diagram for the realization of the method of FIG. 1 on an FPGA structure.

FIG. 2 shows for a control module structure how the method of the protocol-controlled antenna selection may be realized on an FPGA chip whose functional units are schematically illustrated. In this context, the FPGA chip includes the control unit 40, a clock generation unit 42, an adder 44, a first counter 46, a second counter 48, a third counter 50, a fourth counter 52, a setting unit 54, an association unit 56, an SOF/EOF decoder 58 and a parallelization device 60.

The clock generation unit 42 comprises a plurality of outputs connected to inputs of all further functional units to enable a clock-synchronous operation of all functional units. Additionally, an externally generated clock may be predetermined for the clock generation unit 42 via a clock input 62, and a clock mode may be selected by the control unit 40, for which purpose it is connected to 2 inputs of the clock generation unit 42 via lines 64 and 66. The FPGA structure is connected to the read/write device 16 via a data interface 68 to exchange data and control signals with the read device. A user interface 70 is connected to inputs of the control unit 40 to enable user inputs. Via a data connection 72, the control unit 40 is connected to the setting unit 54 in which the basis settings of the system parameters, such as the number of the antennas, are stored. The control unit 40 is connected to each of the counters 46, 48, 50 and 52 via data lines 74, the number to be counted by the counter being present at an input "N" of each counter, an input "start" initiating the start of the counting operation, and an input "reset" resetting the number output at the outputs of the counters. An output of the counters 46, 48 and 50 is connected to an input of the adder 44, respectively, an output of the counters 46, 48, 50 and 52 is connected to the control unit 40, respectively, and a first output of counter 52 is connected to an input of the association unit 56. The adder 44 is connected to a second input of the association unit 56, and the control unit 40 is connected to a third input of the association unit 56 via a line 76. An output 78 of the association unit 56 is connected to an input of a 1-from-N-decoder 80 outside the FPGA structure.

The clock generation unit 42 serves for clock generation, clock division and clock synchronization. The core of the control module of FIG. 2 is formed by the control unit 40 calculating the turn-on time, or the frame time, of the antennas due to incoming protocol information. For calculation of the frame times and selection of the antennas, the protocol information, further data of the read device 16 and user settings are present at the control unit. The SOF/EOF decoder 58 determines the beginning, or the end, of the data transmit protocol, i.e. the beginning of a data packet, the "start of frame" SOF, and the end of a data packet, the "end of frame" EOF. Additionally, the serial information signals, or protocol information, may be converted by the parallelization device 60 into parallel information for further processing.

Examples of the information used by the read device 16 are the signals SOF and EOF and the command code, the response code, the collision status, and a comparison of the results. Via a user interface 70, a user may continue to define an operational mode, an antenna number, a number of antennas, a start bit and a frame time, for example.

The control unit 40 also transmits diverse information and signals to the read device 16 to thereby initiate control operations of the read device, such as signals for a frame start bit indicating the beginning of a new antenna frame and signals indicating switching to the next antenna.

From the signals made available to it by the read device 16 and the information input via the user interface 70, the control unit 40 calculates the control signals for the counters 46, 48, 50 and 52 building up different portions of the transmitting frames, respectively, and forwarding those to the adder 44. The adder connects the single frame portions to a total frame time for the antenna. Splitting the total frame time into multiple single portions is necessary since, apart from various reaction portions, also protective intervals are needed. These accrue, for example, due to the fact that the transponder takes the energy needed for its function from the electromagnetic wave transmitting the data themselves. Therefore, the transponder must be exposed to the turned-on antenna field over a definite time of energy collection until it is fully functional, which may be ensured by means of a single frame portion from the counter 46, for example. A protective interval after the transmission of the actual data may become necessary, for example, if another antenna is to be used after transmission of the data.

The association unit 56 combines the antenna number calculated by the control unit and transmitted to the association unit by means of the signal line 76 with the antenna frame time calculated by the adder 44 and directs the generated signals to the 1-from-N decoder 80. There, these signals are there decoded and used for the excitation of the single antennas of the connected antenna field.

Figure 3:
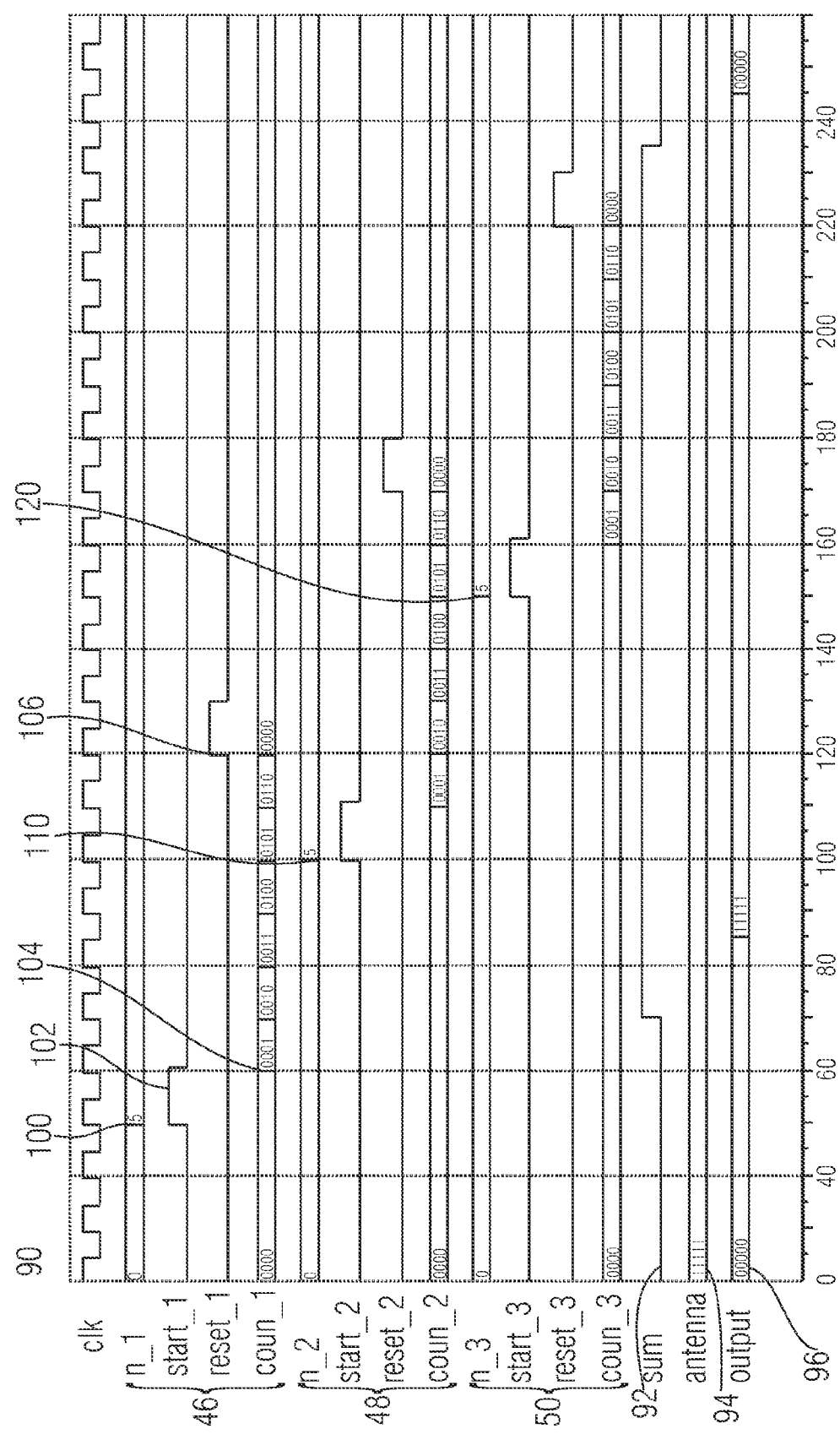
FIG. 3 shows the timelines of selected signals as they occur on the FPGA structure of FIG. 2.

FIG. 3 shows the signals of the control module structure of FIG. 2, which are crucial for generating an antenna frame. In this context, time is plotted on the x-axis in random units. Signal 90 is the clock signal generated by the clock generation unit 42, and all other signals are synchronized with the clock. It is the signals described on the basis of FIG. 2 controlling the counters, "n, start" and "reset", and generated by the control unit 40 for the counters 46, 48 and 50 that are illustrated. Additionally, the signal "count" indicates the numbers output at the outputs of the counters, respectively. A signal 92 shows the signal present at the output of the adder 44, and a signal 94 indicates the number of the antenna calculated by the control unit 40, as it is present at the input of the association unit 56 via the line 76. A signal 96 describes the number output at the output of the association unit 56.

As can be seen in FIG. 3, a first frame portion with a length of five clock cycles is calculated by the control unit 40 at time 100, and with a starting signal 102, the counter 46 begins, from zero and with each clock cycle, to increment the number output at its output until it is reset with a signal 106. At time 110, a second frame portion of a length of five clock cycles is calculated for the counter 48 by the control unit 40. In the same way as described above for the counter 46, the counter 48 begins to increment the number at its output. At time 120, the control unit 40 calculates a third frame portion counted up by the counter 50 at its output. The adder 44 adds the number sequences present at its inputs, so that the signal is active at its output altogether over 15 complete clock cycles. The antenna number 94 determined by the control unit 40 is combined with the output signal of the adder 44 by the association unit 56, so that the 1-from-N decoder 80 obtains, altogether over 15 complete clock cycles, the number of the selected antenna as input signal 96.

Although the invention has been discussed herein on the basis of FIG. 1 and FIG. 2 for the application to a transponder read/write device, it is applicable to any data transmitting technology conceivable, in which transmitting and receiving antennas are employed, such as the Wireless Lan technology. In particular, each data transmit protocol instead of the ISO/IEC 15693 protocol exemplary quoted may be used by the control module 40 for analysis to control the antenna field 14. Also, the protocol parameters used for the analysis, as described on the basis of FIG. 1 and FIG. 2, are not established. Apart from this, all further information which can be extracted from the transmit protocol may be used for controlling the antenna field 14. In addition, by controlling the antenna field 14 by setting certain operational modes for the control module 40, an antenna may be pre-selected by user inputs, or the timeline of the turn-on point of different antennas may be determined on the basis of a predetermined process plan. The antenna frame times, too, may be set to a fixed value by a user input, or may be varied by a predetermined timeline. Also, it is not absolutely necessary that the antennas of the antenna field 14, which are controlled by the control module 14 and which are spatially arranged mounted in a predetermined arrangement, for example, have the same frequency domain.

The functional blocks 10, 14 and 16 shown in FIG. 1 may also be included in larger functional blocks, or may be split up in a different manner. In particular, any combinations may be formed from the functional blocks 10, 14 and 16 to include those within a single device, for example. In this context, the control module 10 and the read/write device 16, for example, may be included within a single device, and the inclusion of the read/write device 16 and the antenna field 14 or the antenna field 14 and the control module 10 within a single device is also possible.

It is not necessary for the method to be realized on an FPGA structure, as is shown in FIG. 2, and any other execution forms of the method are conceivable, such as the realization in an ASIC or in a microcontroller, for which purpose the functional blocks shown in FIG. 2 may be correspondingly adjusted. The clock generation unit 42 shown in FIG. 2 serves for the clock generation and synchronization of all components, and optionally, it may be controlled by an external clock, it may generate the clock itself, it may use, by division, a present clock for synchronization, or the clock synchronization may be performed in a different manner. Coding of association unit 56 encoding the length of the antenna frame to be used and the antenna number together into one signal may be realized in any manner different from that shown in FIG. 3. Accordingly, any alternative execution form which is capable of controlling a field of antennas is conceivable for the 1-from-N decoder 80; for example, this functional unit may be integrated in the FPGA structure.

In a further embodiment of the present invention, the invention serves for the generation of protocol-dependent time frames for controlling antennas of an antenna field. In this process, the information needed for the generation of the respective time frames is derived from the protocol between the read/write device and the transponder, but it may also be predetermined by an algorithm which can be set or be set by the hand.

A further embodiment serves for generating the antenna number, the order of the antennas selected being also generated by the protocol in this process but being also capable of being predetermined by an algorithm or of being set by the hand, as with the calculation of the frame time.

A further embodiment serves for combining of the calculated frame times with a selected antenna.

Depending on the circumstances, the inventive method for protocol-controlled antenna selection may be implemented in hardware or software. The implementation may also be on a digital storage medium, in particular, on a disc or a CD with electronically readable control signals which may cooperate with a programmable computer system such that the inventive method for protocol-controlled antenna selection is executed. In general, the invention thus also is a computer program product with a program code stored on a machine-readable carrier for performing the method according to the invention when the computer program product runs on a computing device. In other words, the invention may thus be realized as a computer program with a program code for performing the method when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for determining an active phase of an antenna during a transmitting or receiving operation, comprising: receiving protocol data of a transmit protocol controlling data flow between a transmitting device and a receiving device; evaluating, through a controller, the protocol data to derive a transmit/receive duration for the data flow between the transmitting; device and the receiving; device; determining, based on the derived transmit/receive duration, a time interval for the duration of the active phase of the antenna; and controlling the active phase of the antenna on the basis of the evaluation of the protocol data;

wherein the protocol data comprise a response code including the reaction to a transmitting operation.

2. A method for determining an active phase of an antenna during a transmitting or receiving operation, comprising:

receiving protocol data of a transmit protocol controlling data flow between a transmitting device and a receiving device; evaluating, through a controller, the protocol data to derive a transmit/receive duration for the data flow between the transmitting device and the receiving device; determining, based on the derived transmit/receive duration, a time interval for the duration of the active phase of the antenna;

controlling the active phase of the antenna on the basis of the evaluation of the protocol data;

determining an active antenna from a plurality of antennas of a main communication device on the basis of the protocol data; and selecting the active antenna during the transmitting or receiving operation.

3. The method according to claim 2 for secure identifying and/or for localizing a side communication device by the main communication device by repeatedly evaluating identical protocol data using different antennas determined by the controller.

4. The method according to claim 1 wherein the active phase and the selection of the antenna of an RFID transmit/read device are controlled.

5. The method according to claim 1, wherein the protocol data of the ISO/IEC 15693 protocol are evaluated.

6. A non-transitory computer-readable medium for storing a computer program comprising a program code for executing a method for determining an active phase of an antenna during a transmitting or receiving operation, comprising: receiving protocol data of a transmit protocol controlling data flow between a transmitting device and a receiving device; evaluating, through a controller, the protocol data to derive a transmit/receive duration for the data flow between the transmitting device and the receiving device; determining, based on the derived transmit/receive duration, a time interval for the duration of the active phase of the antenna; and controlling the active phase of the antenna on the basis of the evaluation of the protocol data, the protocol data comprise a response code including the reaction to a transmitting operation, when the program runs on a computer.

7. A device for determining an active phase of an antenna during a transmitting or receiving operation, comprising:

a receiving device for receiving protocol data of a transfer protocol controlling data flow between a transmitting device and a receiving device;

a controller for evaluating the protocol data which is implemented to be able to derive a transmit/receive duration for the data flow between the transmitting device and the receiving device, and to determine, based on the derived transmit/receive duration, a time interval for the duration of the active phase of the antenna; and a device for controlling the active phase of the antenna on the basis of the evaluation of the protocol data;

wherein the protocol data comprise a response code including the reaction to a transmitting operation.

8. A device for determining an active phase of an antenna during a transmitting or receiving operation, comprising: a receiving device for receiving protocol data of a transfer protocol controlling data flow between a transmitting device and a receiving device a controller for evaluating the protocol data which is implemented to be able to derive a transmit/receive duration for the data flow between the transmitting device and the receiving device, and to determine, based on the derived transmit/receive duration, a time interval for the duration of the active phase of the antenna; a device for controlling the active phase of the antenna on the basis of the evaluation of the protocol data;

a device for determining an active antenna from a plurality of antennas of a main communication device on the basis of the protocol data; and a device for selecting the active antenna during the transmitting or receiving operation.

9. The device according to claim 8 for secure identifying and/or for localizing a side communication device by the main communication device by repeatedly evaluating identical protocol data using different antennas determined by the controller.

10. The device according to claim 7, wherein the active phase and the selection of the antenna of an RFID transmitting/read device are controlled.

11. The device according to claim 7, wherein the protocol data of the ISO/IEC 15693 protocol are evaluated.

12. A non-transitory computer-readable medium for storing a computer program comprising a program code for executing a method for determining an active phase of an antenna during a transmitting or receiving operation, comprising: receiving protocol data of a transmit protocol controlling the data flow between a transmitting device and a receiving device, evaluating by a controller the protocol data to derive the transmit/receive duration for the data flow between a transmitting device and a receiving device, based on the derived transmit/receive duration, determining a time interval for the duration of the active phase of the antenna, controlling the active phase of the antenna on the basis of the evaluation of the protocol data, determining an active antenna from a plurality of antennas of a main communication device on the basis of the protocol data, and selecting the active antenna during the transmitting or receiving operation, when the program runs on a computer.

13. The method according to claim 1, wherein the protocol data include a command code describing the target of the communication to be performed and comprising control information about the communication to be performed.

14. The device according to claim 7, wherein the protocol data include a command code describing the target of the communication to be performed and comprising control information about the communication to be performed.

* * * * *